United States Patent [19]
Stoll et al.

[11] Patent Number: 5,834,662
[45] Date of Patent: Nov. 10, 1998

[54] ARRANGEMENT FOR THE ROTARY ACTUATION OF AN APPARATUS ON A CHASSIS OR FOUNDATION

[75] Inventors: Klaus Stoll, Hochstadt/Aisch; Erich Russ, Gremsdorf, both of Germany

[73] Assignee: IMO-Industrie-Momentenlager Stoll & Russ GmbH, Gremsdorf, Germany

[21] Appl. No.: 733,371

[22] Filed: Oct. 17, 1996

Related U.S. Application Data

[63] Continuation-in-part of Ser. No. 260,186, Jun. 15, 1994, abandoned.

[30] Foreign Application Priority Data

| Jun. 19, 1993 | [DE] | Germany | 43 20 376.0 |
| Jul. 29, 1993 | [DE] | Germany | 93 11 316.1 U |
| Aug. 13, 1993 | [WO] | WIPO | PCT/EP 93/02156 |

[51] Int. Cl.$^6$ .................................................. F16H 1/16
[52] U.S. Cl. ........................... 74/425; 74/411; 74/606 R; 384/513
[58] Field of Search ................... 74/89.14, 411, 74/425, 427, 606 R; 384/502, 513

[56] References Cited

U.S. PATENT DOCUMENTS

| 2,230,989 | 2/1941 | Barish | 384/502 |
| 2,582,690 | 1/1952 | Franz | 74/427 |
| 3,067,627 | 12/1962 | Pickles | 74/425 |
| 3,190,138 | 6/1965 | MacChesney | 74/425 |
| 3,575,060 | 4/1971 | Warren | 74/425 |
| 3,710,640 | 1/1973 | Stanger et al. | 74/425 |
| 4,616,528 | 10/1986 | Malinski et al. | 74/626 |
| 4,627,300 | 12/1986 | Stoy | 74/89.15 |
| 4,979,603 | 12/1990 | Wheatland | 74/425 X |

FOREIGN PATENT DOCUMENTS

| 0031873 | 7/1981 | European Pat. Off. . | |
| 2053523 | 4/1972 | Germany . | |
| 2405745 | 2/1974 | Germany | 74/425 |
| 2345004 | 3/1974 | Germany . | |
| 2325713 | 12/1974 | Germany . | |
| 3321854 | 12/1984 | Germany . | |
| 3446438 | 6/1986 | Germany . | |

Primary Examiner—Charles A. Marmor
Assistant Examiner—Troy Grabow
Attorney, Agent, or Firm—Pandiscio & Pandiscio

[57] ABSTRACT

The present invention relates to an arrangement for the rotary actuation of an apparatus, for example of a crane, on a chassis or a foundation wherein a worm gear (1) and a housing (2) are secured on the foundation, a worm (3) is rotationally displaceable manually, or by a drive motor, and a worm wheel (4) is rotationally mounted to the housing (2). The worm wheel (4) is provided at both sides (6a, 6b) of its gearing (6) with a separate rolling bearing (10, 11, 12). Advantageously, housing (2) is formed with a base part (2a) and a cover part (2b) which can be flatly fixed on top of the base part (2a), and at least one end side of the worm wheel comprises a connection attachment which intersperses the base and/or the cover part. The housing is formed so that both the outer rings (12) of the rolling bearings lie against and/or are fixed to the corresponding wall of the base and cover parts (2a, 2b) of the housing (2), and the two corresponding inner rings (10) each lie against and/or are fixed to the wall of the worm wheel (4).

13 Claims, 4 Drawing Sheets

ARRANGEMENT FOR THE ROTARY ACTUATION OF AN APPARATUS ON A CHASSIS OR FOUNDATION

CROSS-REFERENCE TO RELATED APPLICATION

This is a continuation-in-part of application Ser. No. 08/260,186, filed Jun. 15, 1994, now abandoned, in the names of Klaus Stoll and Erich Russ.

FIELD OF THE INVENTION

The invention relates to an arrangement for the rotary actuation of a machine or plant part, for example of a crane, on a chassis or foundation, using a worm gear, the housing of which is secured on the chassis or foundation.

BACKGROUND OF THE INVENTION

On known drives for mobile cranes, the pivoting movements are brought about, for example, by means of two hydraulic cylinders which are formed as gear racks and are disposed to the left and right of a king trunnion mounting. The rotary forces are transmitted onto a largely dimensioned pinion by means of the gear rack. Through this arrangement of the hydraulic cylinder drives, the gear used maintains considerable elongation in order to transmit high tilting moments.

A gear arrangement is known (DE-OS 34 46 438) wherein the worm wheel is mounted through only one cross roller bearing. Through the single-shear bearing arrangement a tilting moment arises through the drive (worm wheel, worm). This has an adverse effect because through this, supporting capability of the single-shear bearing is lost and such high external forces cannot be transmitted. Furthermore, a higher tilting of the worm wheel arises through the single-shear bearing arrangement, which has a very adverse effect on the engagement relationships of the worm gearing. The single-shear bearing connects through a screw connection of the outer ring with the housing and of the inner ring with the worm wheel. This is associated with extra expenditure of production and assembly.

Furthermore, arrangements with worm gears of approximately the initially named kind are known (U.S. Pat. No. 4,616,528; U.S. Pat. No. 3,710,640; EP-A-O 031 873; DE-A-33 21 854), on which the worm wheel in the gear housing is incorporated twice or two-shear. Two-shear bearing arrangement means that two separate bearings for the worm wheel, for example rolling bearings, are disposed coaxially to one another. In the arrangements from the named sources, the worm gears are used without exception as a gear stage for valve applications, multiple drives particularly with d.c. motors or spindle lifting gears and spindle sliding gears. Common to these embodiments is that no particular arrangements are made against the influences of extraordinary tilting moments onto the shaft or axis of the worm wheel. The housings, as far as can be seen, are without exception one-pieced and on the basis of their structure, cannot contribute to guaranteeing or to at all increasing the solidity and stability of the axis or shaft of the worm wheel, which is used, for example, for output.

SUMMARY OF THE INVENTION

The object of the invention is to create a worm gear arrangement for rotary actuation which, on the one hand, has a compact, space saving construction and, on the other hand, has the capability to take up and transmit extraordinarily high external forces (axial and radial forces) and moments, above all tilting moments.

The gear housing, then, is divided into an upper and lower part, one of the two parts being interspersed by the connection attachment of the worm wheel to the machine or plant part to be rotated. In that the outer rings of the two rolling bearings are each secured at an upper and lower part of the housing and the corresponding inner rings are secured at the worm wheel and, following that, the upper part and lower part are tightly screwed together to form the entire housing, a compact, space saving and solid unit results, in which the gear and bearing arrangement are constructionally integrated into one another. In particular, the rolling bearings are braced and additionally stabilized by this. In this way the part to be rotated with extraordinary weight can be assembled on the worm wheel, whereby not only high axial and radial forces, but also high tilting moments can be taken up in an operationally safe way.

The gear arrangement according to the invention is suitable above all for directly driving machines and plant parts. It can replace the known rotary connections and pinion with intermediate gearing, with less constructional expenditure and increased reliability. In that the two-shear bearing arrangement of the worm wheel cooperates, according to the invention, with the housing parts which are screwed together, a worm wheel with simple construction and large cost saving can be taken up in the gearing housing, which is also robust relative to tilting moments.

The angular rolling bearings have a diameter which is nearly the same as the diameter of the gearing, have a great number of rolling elements, and are manufactured from very hard and rigid material, preferably steel. Therefore, these bearings are able to support the machine part and to receive all external stresses, so that an additional bearing for the apparatus is not necessary and the construction height can be reduced. For this reason, bearings according to the invention can be used for special cranes, for connecting the axle-tree of a heavy-duty trailer in a steerable manner to its undercarriage chassis, or for liftable work platforms.

The worm gear according to the invention can be used with both the worm wheel or the housing connected to the apparatus. The latter construction may be preferred when a hydraulic motor is coupled to the worm and all hydraulic elements are installed within the apparatus.

Due to the closed housing, the drive arrangement according to the invention is largely screened against parasitic induction from the surroundings, which increases the ease of maintenance. No such high demands of constructional exactness need be placed on the connection construction with the connecting attachment, since the drive arrangement according to the invention has a high intrinsic rigidity to start with. This results, among other things, from the measure according to the invention that, on the one hand the worm wheel and on the other hand the upper and lower part (base or cover part) of the gear housing are each used as carrier elements for the hardened raceway shells (inner and outer rings) of the two-shear bearing arrangement. Furthermore, the two housing parts are rigidly connected with one another or fixed to each other. The bearings of the worm wheel can be four-point bearings (ball), as well as roller bearings. The bearing forces are transmitted by means of further securing screws at outer flanges of the housing, or the like, into the surrounding construction. Due to the measures according to the invention, the housing and the worm wheel are in the position to take up the high external forces stemming from the heavy machine and plant parts, the high external forces being transmitted by means of the bearings. The upper part, or cover part, of the housing can, for example, take over the function of taking up the external tensile forces. Furthermore, the housing can hold the bearing free of backlash or hold the initial tension.

According to a particular embodiment, the housing parts lie together via sealing means in order to be sealed against the environment.

The basic principle according to the invention of spatially extending, as it were, the bearings of the highly loaded worm wheel in the applications contemplated, corresponds to a further development of the invention according to which the worm wheel is mounted rotationally by means of two separate inclined rolling bearings, on which the rolling elements are each encompassed, by the inlays or by the inner and outer ring, with a peripheral section between 60° and 120°, preferably approximately 90°. This excludes the way known per se (see above) of arranging the worm wheel with a single cross rolling bearing. Radial, axial loads and tilting moments can be advantageously taken up by means of the two angular ball bearings.

To achieve a constructively simple coupling of the part to be rotated to the gear arrangement, it is suggested, according to another further development of the invention, that at least one end face or other non-geared side wall of the worm wheel is specifically formed to connect with the part to be rotated, be it through a ring of bores to be screwed, or through hook-shaped locking elements, for example, or latching devices. A one-piece connection between worm wheel and the part to be rotated is also conceivable within the framework of the invention.

The manufacturing costs are lowered when, according to another further development of the invention, the inlays or inner and outer ring of the rolling bearings are radially slotted throughout. The possibility is then created of not only manufacturing the inlays economically from a single run, but of also being able to spread the inlays out quickly during the incorporation or the assembly.

By using rolling bearings, the outer ring is expediently fixed at the inner wall of the gear housing and the inner ring at the worm wheel to be rotated. The rolling bearings are connected by the gear cover to form one unit.

So that as high a torque as possible can be transmitted, two or more worms according to another development of the invention are disposed which act upon the common worm wheel.

With extreme loading it can also be expedient within the framework of the invention to embody rolling bearings with several rolling ring elements which roll off tracks and which are angled to each other. Here, for example, a rolling ring element can be provided exclusively for transmitting radial forces and each further rolling ring element for transmitting axial forces in both directions of moments. The first rolling element set would roll off cylindrical running tracks whereas the two other rolling ring elements roll off on flat surfaces perpendicular thereto. Such bearing modules are known per se as double axial radial bearings.

In known worm drives, particularly when they are not used purely as transmitting drives but in the sense of the type according to the invention for directly driving machines and plant parts (DE-OS 34 46 438), the following problem can easily arise: The rotating worm wheel must sometime be braked in the shortest possible time. Since, as a rule, a lot of mass moves with the rotating worm wheel in the named applications, kinetic energy is to be converted to a large extent. As a result of this, it can happen when braking quickly, that the worm wheel gearing or the worm thread engaging it, breaks.

Consequently, the further problem within the framework of the invention is raised, of intercepting dynamic forces arising during the running and in particular the braking of the worm wheels which are coupled with a machine part and to compensate such that a destruction of the gear engagement between worm and worm wheel is prevented. To achieve this, in a worm gear arrangement with the initially named features according to the invention, it is suggested that the worm is not only rotationally mounted, but is also mounted displaceably in its longitudinal direction against spring force (linear). In other words, one or several spring elements are disposed within the gear housing such that they stand in the way of the linear displacement of the worm with their spring force. This can be expediently achieved in that the spring element or elements on the one hand are supported or engaged against the housing wall and on the other hand at the worm. With this embodiment according to the invention, mass forces of the rotating parts can be compensated without the gearing being damaged due to overloading. A shock-type braking is avoided.

Spring devices are advantageously combined in the set after one or both end so the worm thread, for example, one or several screws or adjacent Belleville spring washers, which each engage between a thread end side and the worm shaft end while supported against the housing wall.

With the spring compliance according to the invention, the worm is allowed a certain stroke within the housing or framework by means of which braking forces and deceleration loading can be balanced out or compensated.

The worm in each case is advantageously mounted on both sides at its ends with a radial and axial bearing, because through this the external mass forces or impacts can be softened, and pretensioned Belleville spring washers can be disposed between the axial bearings and the worm.

With the aim of strengthening the robustness against tilting moments, an expedient embodiment exists in that the cover and base part of the housing are placed on top of each other in the direction of the worm wheel axis, or parallel thereto. The adjacent support surfaces of the two housing parts increase the solidness and then prevent the tilting together of the housing parts, a stable support being also guaranteed for the outer rings of the two-shear worm wheel bearing arrangement. Advantageously the common support surfaces of the housing parts are dimensioned such that they can be interspersed by fixing means, particularly screw means. The tilting is further reacted against when the fixing or screw means extend parallel to the worm wheel axis, the common support surfaces of the housing parts being pressed together with maximum force. By this means the stability of the bearing arrangement is optimized.

Within the framework of the invention the connecting attachment of the worm wheel intersperses the cover or base part or one of the two housing parts axially or parallel to the axis. By this means the connection extension can particularly easily be used for receiving and for carrying the machine or plant part to be rotated.

The worm gear actuation drive arrangement according to the invention can be used particularly in mobile, construction, harbour and industrial cranes, excavators, lifting platforms, deep shovel dredgers, concrete mixers, fork lifting ancillary equipment, revolving welding tables and concrete pumps, for forming the necessary rotary connection in each case. Further areas of application for the drive arrangement according to the invention are swinging devices for grabs, track pinch bars, working load turning machines, ancillary manipulators, swinging stacker equipment, car park systems, swinging lifting platforms, motor vehicle winches and wall winches, body bolsters for heavy road vehicles, steering drive units for heavy goods vehicles, machines for packing and filling, labeling, sorting, mixing and stirring works, thickening plants and research plants for discharge water and mud treatment, construction machines, drag bearings, dredger-loaders, universal dredgers, robots, feeding machines, rotary indexing tables and reversible clamping devices.

BRIEF DESCRIPTION OF THE DRAWINGS

Further details, features and advantages on the basis of the invention result from the sub claims as well as the following description of a preferred embodiment of the invention with reference to the drawings, in which:

DETAILED DESCRIPTION OF THE PREFERRED EMBODIMENTS

Figure 1:
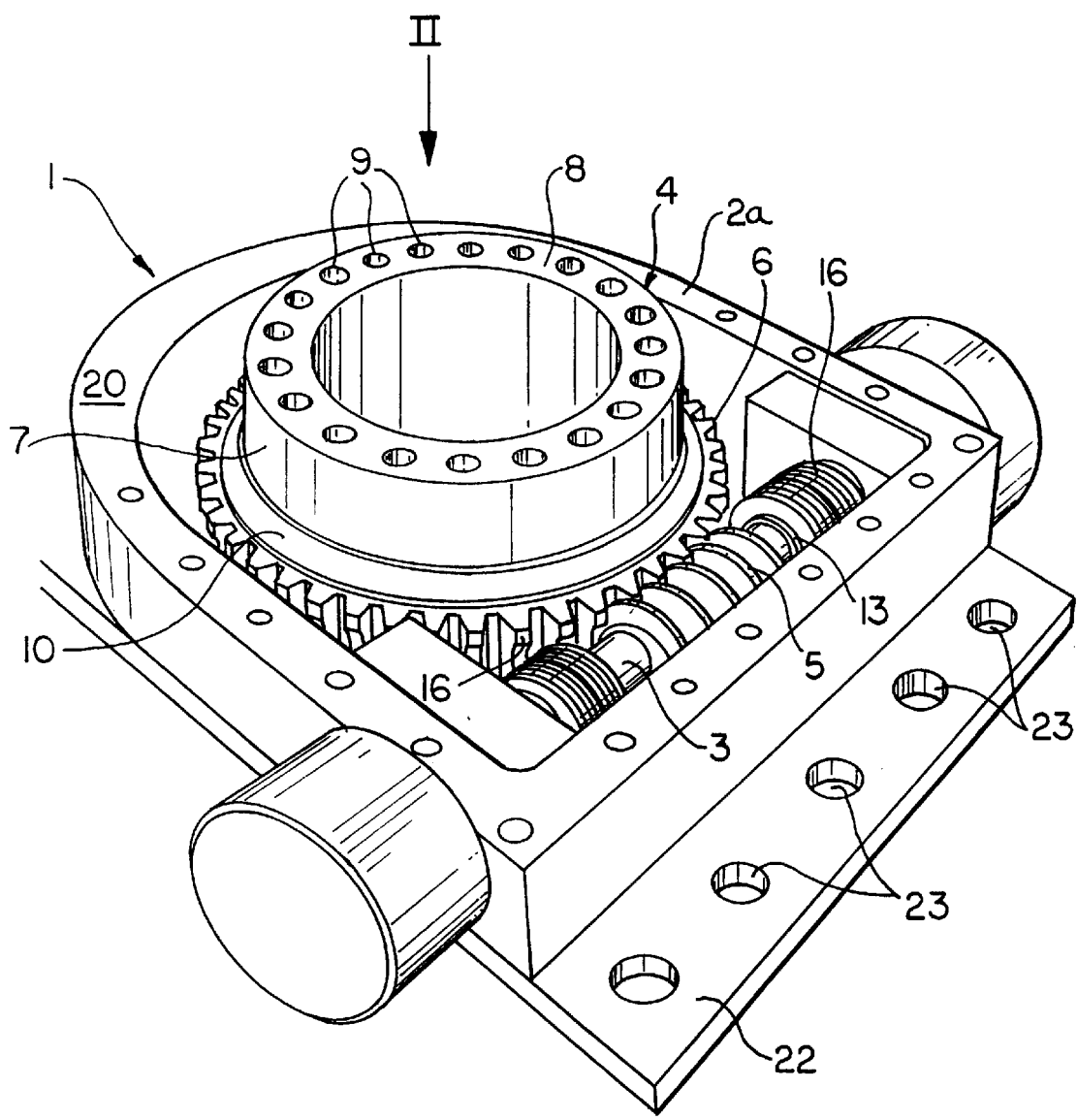
FIG. 1 is a perspective illustration of a drive arrangement with worm gear.

According to FIG. 1, the worm gear 1 for the actuation arrangement used according to the invention comprises a gear housing 2 (FIG. 3), with a base part 2a, in which a worm 3 and a worm wheel 4 are mounted rotationally. The base part 2a has a support surface 20, interspersed by a row of inner thread bores 21 axially parallel to the worm wheel 4. At the straight front side of the base part 2a largely bent in the example, a projecting securing flange 22 is formed, over the securing holes 23 of which a fixing to a foundation or chassis (not shown) can be effected. The worm 3 which engages with the gearing 6 of the worm wheel 4 by means of its screw-shaped thread 5, is provided for coupling with a torque drive motor (not shown).

The worm wheel 4 plays a central role within the gear housing 2 according to the invention, as it has several functions:

a) it is supported by bearings 10 within the housing 2;
b) it carries the machine part at one side;
c) it is driven through the worm 3.

As the worm wheel itself takes over all these functions, no shaft is necessary, and the worm wheel may have a central hole. The bearings 10 have a rather large diameter, so that great tilting moments can be tolerated without any bending. This feature makes it possible to use a great number of rolling elements, so that tilting forces are transmitted through several rolling elements, whereby the abrasion is lowered.

As the bearings 10 are fixed to the worm wheel 4, a shaft is not required. Therefore, it is possible to leave a bore in the center of the rim of the worm wheel 4, which can be used for feeding cables, or the like, to the machine part, if the angle of rotation of the machine is limited. The central bore of the worm wheel 4 is a reason for the coronal arrangement of the securing elements 9. A second reason for this arrangement is to provide a strong connection to the machine part, especially with regard to tilting moments.

The worm wheel 4 has at its end side an axially parallel or cylindrically projecting connection attachment 7 in the end wall 8, of which a multitude of securing elements, e.g. screw bores 9, are formed in rows in the direction of the periphery, or in rings. These are used to secure a machine or plant part to be rotated (not shown). Lying on the end side of the worm wheel-gearing 6, is the smaller inner ring 10 of an angular ball bearing (FIG. 4) visible in FIG. 1. By inserting a multitude of balls 11 (FIGS. 3 and 4) into this inner ring 10 and setting on of a larger outer ring 12, the complete angular ball bearing 10, 11, 12, is formed.

Figure 2:
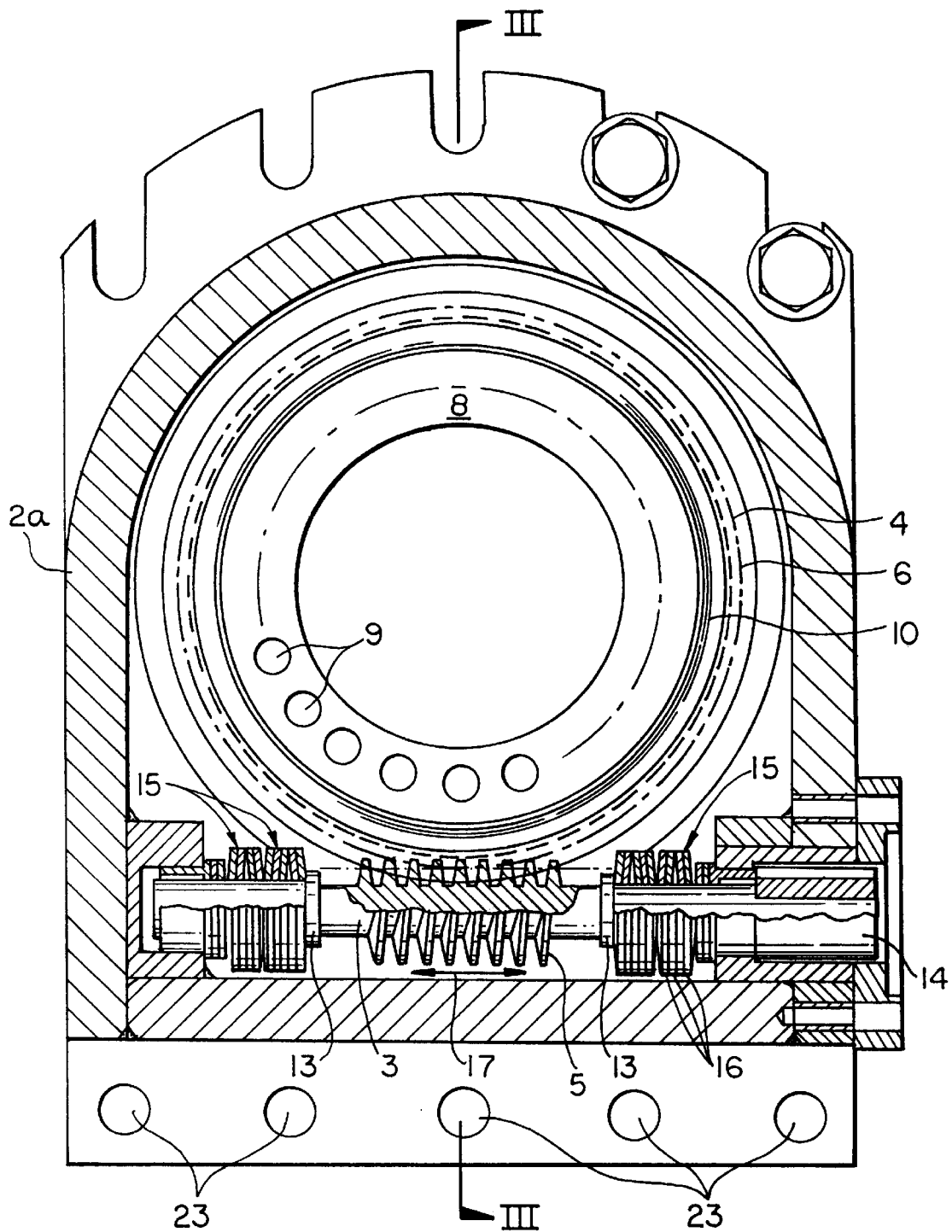
FIG. 2 is a plan view according to the direction II in FIG. 1.

As can be seen from FIG. 1 and FIG. 2, a stop shoulder 13, in each case at a distance from the two end faces of the worm thread 5, is raised and projects in an annular fashion around the worm shaft. Between each of these stop shoulders 13 and worm end sections 14 mounted rotationally in the wall of the housing 2, one or several sets 15 of a multitude of individual Belleville spring washers 16 are disposed particularly such that they clamp.

The Belleville spring washers 16, or the corresponding sets 15, are slipped onto the worm 3 on both sides of the worm thread 5 via their inner recesses until they abut the corresponding stop shoulder 13.

The Belleville spring washers 16 are annular platelets which, according to the partial cross-section illustration in FIG. 2, increasing from their planes, deviate in their two dimensional annular areas by an inclined angle. Within a spring set 15, at least two such Belleville spring washers 16 are laid mirror-imaged to one another such that only their outer edges, which project the most from the said annular plane area, make contact. This deviation is elastically reversibly reduced during axial force, for example, due to transient deceleration or acceleration of the worm wheel 4. The possibility of linear stroke movements 17 for the worm 3 in the gear housing 2 results from this. By means of these stroke movements 17 of the worm 3, dynamic forces arising with abrupt acceleration or deceleration of the worm wheel 4, for example when braking or running, can be taken up on both sides by the spring sets 15, so that an abrupt braking of load is possible without destroying the gearing 6 and/or the thread 5.

Figure 3:
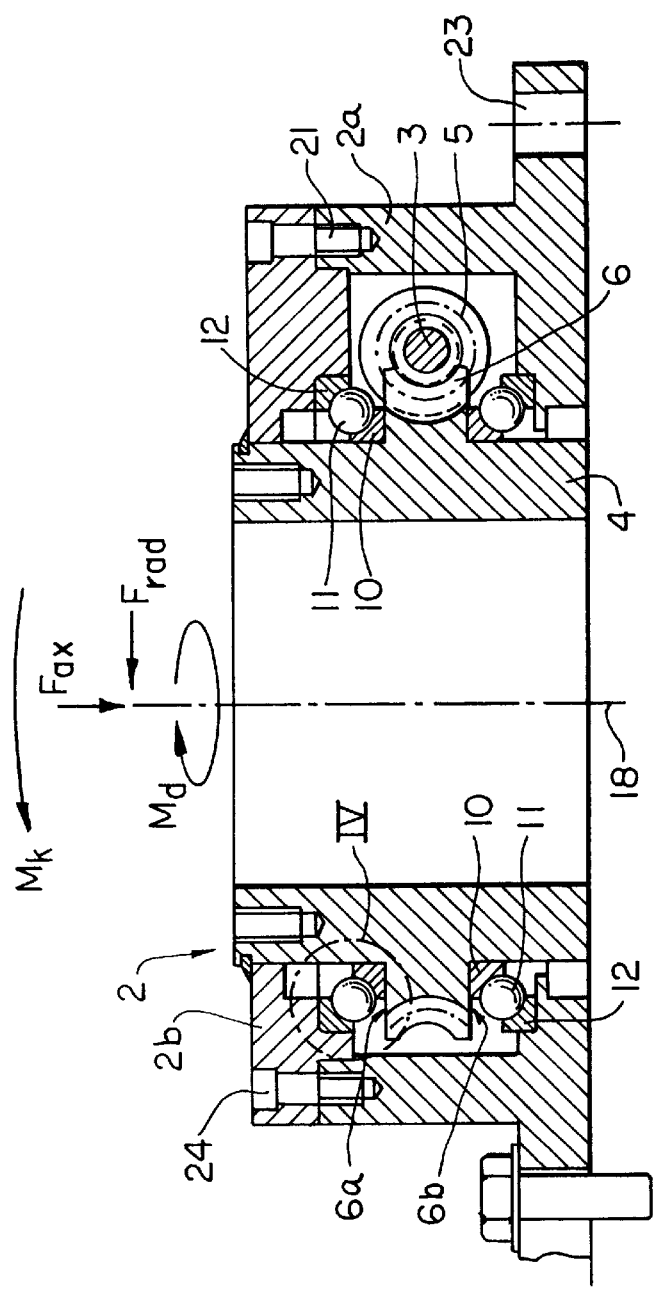
FIG. 3 is a section according to the line III—III in FIG. 2.

According to FIG. 3 an upper cover part 2b is to be set flatly onto the support surface 20 (FIG. 1) of the lower base part 2a to form the entire housing 2. Connection screws 24 which are screwed into the inner thread bores 21 of the base part 2a and engage the cover part 2b by means of flush through bores, are used to rigidly fix together part 2a and part 2b. The worm wheel 4 is mounted such that it is rotatable opposite the gear housing 2 through two ball bearing sets 10, 11, 12, which each lie on one of the two end sides 6a, 6b of the worm wheel gearing 6. With this, the smaller inner ring 10 is always fixed at the corresponding end side 6a or 6b of the worm wheel gearing 6 and the larger outer ring 12 at the inner wall of the housing 2. Therefore, in that the bearing arrangement of the worm wheel 4 is spatially extended by the division of the bearing arrangement, each into a separate ball bearing set 10, 11, 12 for the end sides 6a, 6b at the worm wheel gearing, radial loads $F_{rad}$, axial loads $F_{ax}$ and tilting moment $M_k$ can be taken up to an extraordinary extent, the torque $M_d$ of the worm wheel 4 required for the part to be driven, remaining largely unimpaired around its centre axis 18.

Figure 4:
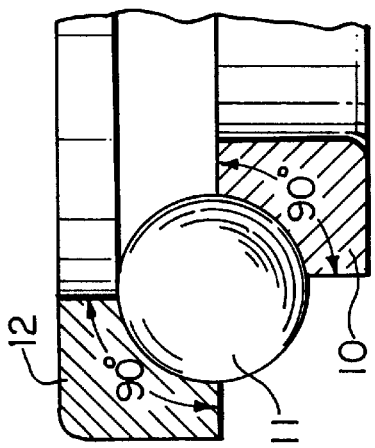
FIG. 4 is an enlarged illustration of the details IV in FIG. 3.

This advantageous effect of the two-shear bearing arrangement is further conveyed by the use of angular ball bearings according to FIG. 4. The inlays or inner and outer rings 10, 12, each surround the bearing balls 11 with only a peripheral section of approximately 90°. If these are disposed flush according to FIG. 3, coaxially or parallel to the axis, to the centre axis 18, a tilting moment $M_k$ can be taken up with greater operational certainty by two cooperating bearings 10, 11, 12 at each one end side 6a, 6b of the worm wheel.

Figure 5:
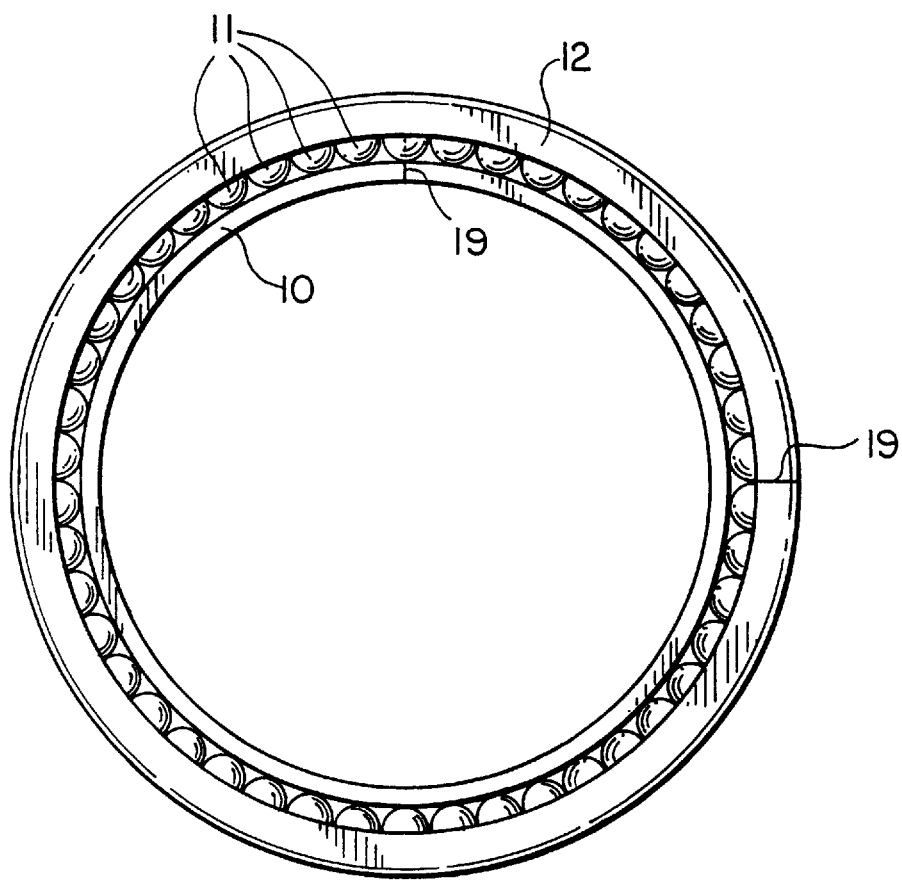
FIG. 5 is the ball bearing used in the arrangement according to FIGS. 1–4 in axial plan view.

In FIG. 5 a complete angular ball bearing set 10, 11, 12 is shown in plan view. Here, radial slits 19 can be seen which intersperse each of the inlays or smaller and larger rings 10 or 12.

What is claimed is:

1. Arrangement for rotary movement of an apparatus on a foundation, said arrangement having the ability of absorbing external stresses, said arrangement comprising a worm gear assembly including a housing, a worm wheel and a meshing worm, wherein the housing is connectable to the foundation and the worm wheel is connectable to the apparatus, characterized in that:
   a) said worm wheel is supported within said housing by two circular arrays of rolling bearings, said bearings being arranged at opposite sides of gearing of said worm wheel;
   b) an axial length of said worm wheel is greater than a diameter of said meshing worm;
   c) said worm wheel gearing is disposed proximate a central plane of said worm wheel normal to the axis of said worm wheel;
   d) said gearing extends radially outwardly of an axially extending side wall of said worm wheel in said plane normal to the axis of said worm wheel;
   e) an inner side of an inner ring of each of said rolling bearing circular arrays is adjacent to and fixed to the side wall of said worm wheel;
   f) one face of the inner ring of each said rolling bearing array is adjacent to an end face of said gearing of said worm wheel, said roller bearing array inner rings each having an inside diameter substantially equal to an outside diameter of said worm wheel side wall;
   g) each of said rolling bearing arrays contains a plurality of rolling elements;
   h) an outer ring of each of said rolling bearing arrays is fixed to said housing;
   i) at least one end face of a rim of said worm wheel is provided with connection means fixed to said worm wheel; and
   j) said connection means is provided with a multitude of securing elements arranged on an end thereof in a circular form;
   k) wherein said worm wheel and said connection means are provided with aligned central bores; and
   l) wherein said connection means comprises a tubular projection extending axially from said worm wheel and beyond said housing.

2. Arrangement according to claim 1, characterized in that has an outside diameter which is smaller than an outside diameter of said outer ring.

3. Arrangement according to claim 1 characterized in that base and top parts of said gear housing each have a recess, in which said outer rings are disposed.

4. Arrangement according to claim 1, characterized in that said roller bearing inner and outer rings are each provided with rolling tracks which lie at a predetermined angle relative to one another.

5. Arrangement according to claim 1 wherein said worm and said worm wheel meshed therewith are each rotatably supported in said housing, characterized in that said worm is additionally supported so as to be displaceable in a longitudinal direction counter to a spring force.

6. Arrangement according to claim 5, characterized in that said spring force opposing the displacement is realized by one or more spring elements which are supported relative to a housing wall and act upon said worm.

7. Arrangement according to claim 6, characterized in that said spring force opposing the displacement is realized by said one or more spring elements which act upon said worm between an end face of its thread and its immediately adjacent, rotatably supported end portion and are supported relative to the housing wall of the gear assembly.

8. Arrangement according to claim 6, characterized in that said one or more spring elements take the form of helical or cup springs, which are penetrated by said worm and are combined to form jointly tensionable sets of springs.

9. Arrangement according to claim 1, characterized in that upper cover and lower base parts of said housing are disposed one on top of the other and are screwed to one another in a selected one of the direction of the worm wheel axis and a direction parallel to the worm wheel axis.

10. Arrangement according to claim 9, characterized in that common supporting surfaces of said base and upper parts of said housing are penetrated by screw means.

11. Arrangement according to claim 10, characterized in that said screw means extend parallel to said worm wheel axis.

12. Arrangement according to claim 7, characterized in that said worm is provided at either of said end portions with a combined radial and thrust bearing.

13. Arrangement according to claim 1, characterized in that said connection means is adapted to receive and support said apparatus.

* * * * *

UNITED STATES PATENT AND TRADEMARK OFFICE
CERTIFICATE OF CORRECTION

PATENT NO. : 5,834,662
DATED : November 10, 1998
INVENTOR(S) : Klaus Stoll et al.

It is certified that error appears in the above-identified patent and that said Letters Patent is hereby corrected as shown below:

In patent claim 2, at end of line 1, add
       --said inner ring--.

Signed and Sealed this

Twenty-third Day of February, 1999

Attest:

Q. TODD DICKINSON

*Attesting Officer*     *Acting Commissioner of Patents and Trademarks*